(12) United States Patent
Kusamoto et al.

(10) Patent No.: US 7,310,227 B2
(45) Date of Patent: Dec. 18, 2007

(54) ELECTRONIC APPARATUS

(75) Inventors: Jyoji Kusamoto, Urayasu (JP); Yuji Nakajima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 11/392,347

(22) Filed: Mar. 29, 2006

(65) Prior Publication Data

US 2006/0232934 A1 Oct. 19, 2006

(30) Foreign Application Priority Data

Apr. 15, 2005 (JP) .............................. P2005-118641

(51) Int. Cl.
*H05K 7/20* (2006.01)

(52) U.S. Cl. ...................... 361/695; 361/689; 361/690; 361/694; 174/16.1; 174/16.3

(58) Field of Classification Search ...................... None
See application file for complete search history.

(56) References Cited

U.S. PATENT DOCUMENTS 5,725,622 A * 3/1998 Whitson et al. ........... 55/385.4
6,657,860 B2 * 12/2003 Matsui et al. ............... 361/695
6,847,524 B2 * 1/2005 Tomioka et al. ............. 361/695
7,120,015 B2 * 10/2006 Furuya ....................... 361/687
7,262,964 B1 * 8/2007 Barsun ....................... 361/695
2005/0276018 A1 * 12/2005 Moore et al. ............... 361/695
2006/0162901 A1 * 7/2006 Aizono et al. ............. 165/80.4
2007/0121292 A1 * 5/2007 Ariga ......................... 361/695

FOREIGN PATENT DOCUMENTS

JP       2002-368467       12/2002

* cited by examiner

*Primary Examiner*—Boris Chervinsky
(74) *Attorney, Agent, or Firm*—Blakely Sokoloff Taylor & Zafman, LLP

(57) ABSTRACT

According to one embodiment, an electronic apparatus includes: a casing having a bottom portion; a circuit board housed in the casing, the circuit board having first and second areas; a heating element mounted on the first area of the circuit board; an elastically-deformable partition member interposed between the circuit board and the bottom portion and surrounding the first area; and a fan having an air take-in port through which air in the first area is taken in.

17 Claims, 6 Drawing Sheets

ELECTRONIC APPARATUS

CROSS-REFERENCE TO RELATED APPLICATIONS

This application is based upon and claims the benefit of priority from Japanese Patent Application No. 2005-118641, filed Apr. 15, 2005, the entire contents of which are incorporated herein by reference.

BACKGROUND

1. Field

One embodiment of the invention relates to an electronic apparatus having a heating element, such as a CPU, and more particularly, to a structure for cooling a heating element through use of a fan.

2. Description of the Related Art

A CPU is incorporated in an electronic apparatus, such as a portable computer. The heat generated when the CPU is in operation increases in association with an increase in processing speed and addition of functions. When the temperature of the CPU has increased excessively, a loss of efficient operation of a CPU arises or the CPU becomes inoperative.

In order to enhance heat dissipation performance of the CPU, a related-art electronic apparatus is provided with an air-cooled cooling device for forcefully cooling the CPU. The cooling device has a heat sink thermally connected to a CPU, and a fan for sending cool air to the heat sink.

The heat sink and the fan are integrated into a single module and housed in a casing of the electronic apparatus. The heat sink assumes the shape of a flat box having a heat-receiving surface for receiving heat from a CPU, a radiating fin, and a cool air passage. The heat sink is formed from, e.g., a metallic material having superior thermal conductivity, such as an aluminum alloy. The radiating fin is exposed to the cool air passage. The cool air passage is separated from the inside of the casing, and the downstream end of the cool air passage is formed into a vent port which is opened in a sidewall or rear wall of the casing.

The fan has a fan case and an impeller. The fan case has a take-in port and an outlet port. The impeller is housed in the fan case. The impeller takes air in by way of the take-in port, and sends the thus-taken air to the cool air passage from the outlet port. Thus, the air sent from the fan flows through the cool air passage as cool air, and cools the heat sink, which receives heat from the CPU, during the course of flow. The cool air heated through the heat exchange performed by the heat sink is emitted from the downstream end of the cool air passage to the outside of the casing by way of the vent port.

Moreover, in a related-art cooling device, an air guide passage is formed between the upper surface of the fan case and the casing. The air guide passage is for connecting an air intake port of the casing to the take-in port of the fan case. The air guide passage is separated from the inside of the casing by means of a partition member such as a sponge. The partition member is interposed between the fan case and the casing (see, e.g., JP-A-2002-368467).

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
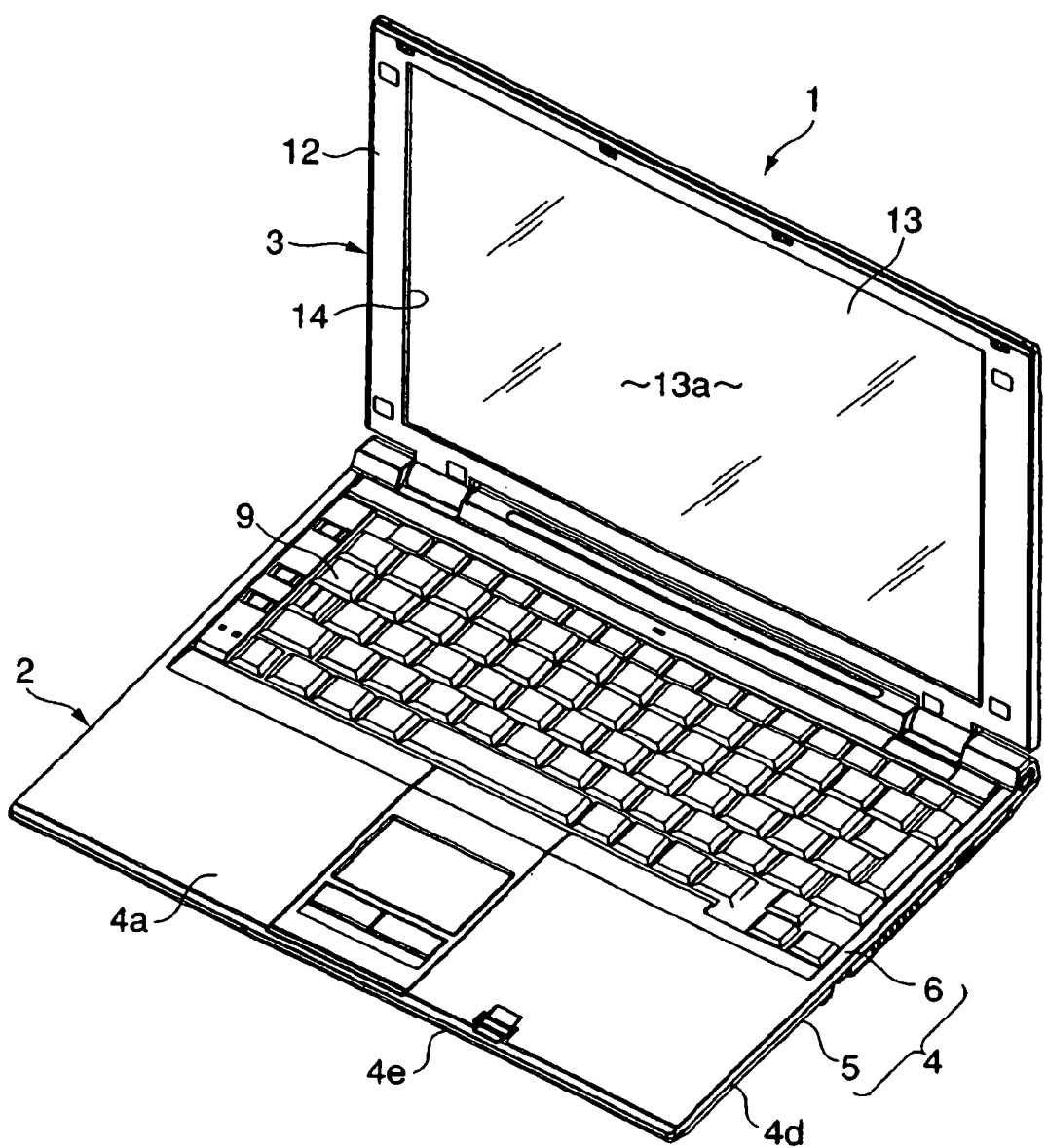
FIG. 1 is an exemplary perspective view of a portable computer according to an embodiment of the present invention.

Various embodiments according to the invention will be described below in detail with reference to the drawings. In general, according to one embodiment of the invention, an electronic apparatus includes: a casing having a bottom portion; a circuit board housed in the casing, the circuit board having first and second areas; a heating element mounted on the first area of the circuit board; an elastically-deformable partition member interposed between the circuit board and the bottom portion and surrounding the first area; and a fan having an air take-in port through which air in the first area is taken in.

An embodiment of the present invention will now be described with reference to the drawing showing application of the present invention to a portable computer.

Figure 2:
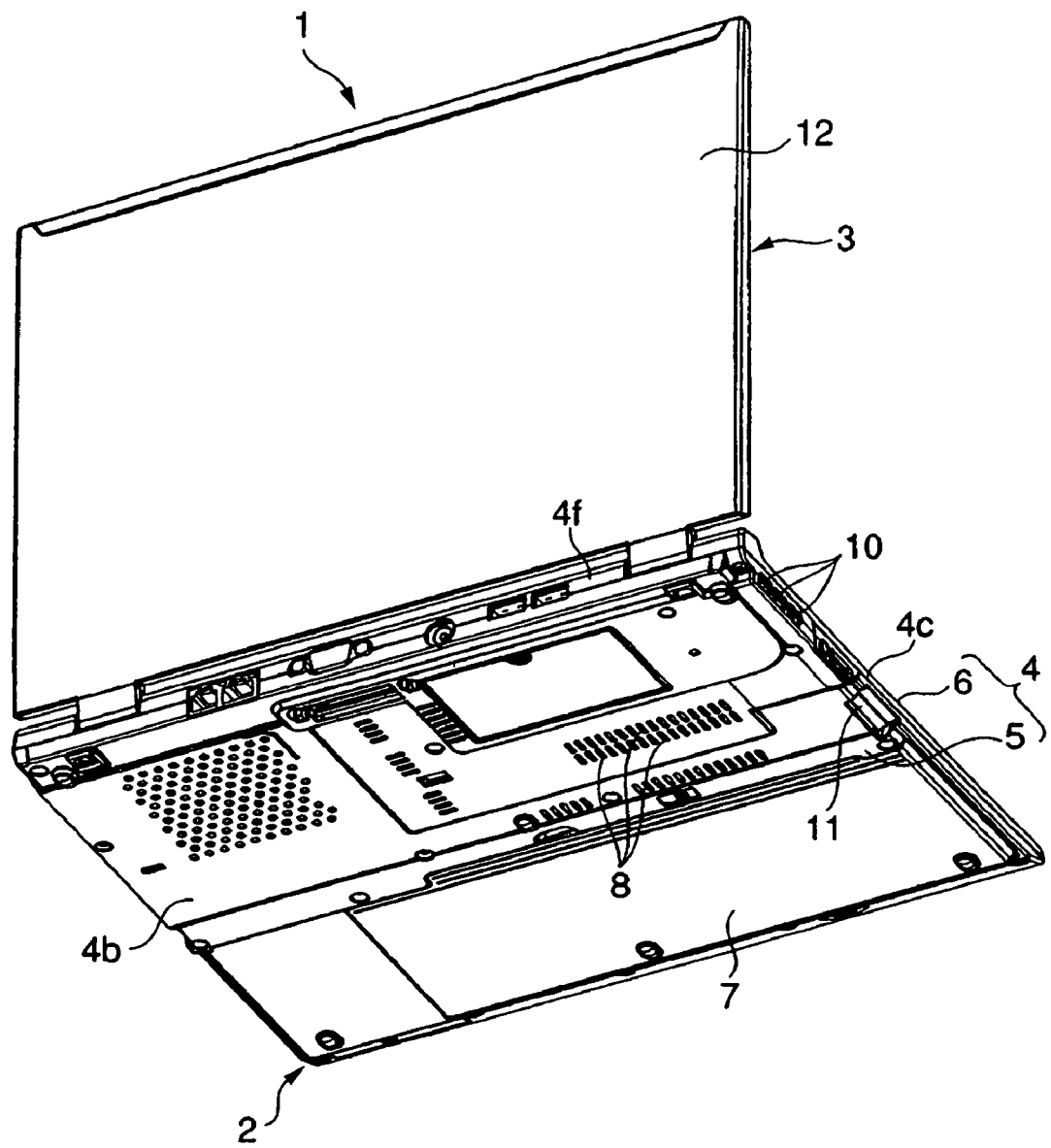
FIG. 2 is an exemplary perspective view of the portable computer of the embodiment where a first casing is viewed from a bottom wall thereof.

FIGS. 1 and 2 exemplary show a portable computer 1 which is an example of electronic apparatus. The portable computer 1 has a main body unit 2 and a display unit 3. The main body unit 2 has a first casing 4. The first casing 4 is formed from, e.g., a metallic material such as a magnesium alloy. The first casing 4 is formed into the shape of a flat box having an upper wall 4a, a bottom wall 4b, right and left sidewalls 4c, 4d, a front wall 4e, and a rear wall 4f.

The first casing 4 is formed from a base 5 and a top cover 6. The base 5 has the bottom wall 4b and supports a battery pack 7 in a removable manner. The battery pack 7 is situated in a front-half area of the base 5.

The bottom wall 4b has a plurality of air inlet ports 8. The air inlet ports 8 are positioned in rear of the battery pack 7 and arranged at intervals in the widthwise direction of the first casing 4. The air inlet ports 8 are opened to the inside of the first casing 4.

The top cover 6 has the upper wall 4a, and supports a keyboard 9. The keyboard 9 is situated in a rear-half area of the upper wall 4a. The left sidewall 4c has a plurality of air outlet ports 10 and a card slot 11. The air outlet ports 10 and the card slot 11 are arranged in a depthwise direction (a front-rear direction) of the first casing 4. The air outlet ports 10 are situated in a rear end of the sidewall 4c.

The display unit 3 has a second casing 12 and a liquid-crystal display panel 13. The liquid-crystal display panel 13 is housed in the second casing 12. The liquid-crystal display panel 13 has a screen 13a for displaying an image. The screen 13a is exposed outside of the second casing 12 by way of an opening section 14 formed in the front surface of the second casing 12.

The second casing 12 is supported by the rear end portion of the first casing 4 by way of a hinge. Therefore, the display unit 3 is pivotable between a closed position where the display unit 3 lies on the main body unit 2 so as to cover the keyboard 9 from above, and an open position where the display unit 3 stands up so as to expose the keyboard 9 and the screen 13a.

Figure 3:
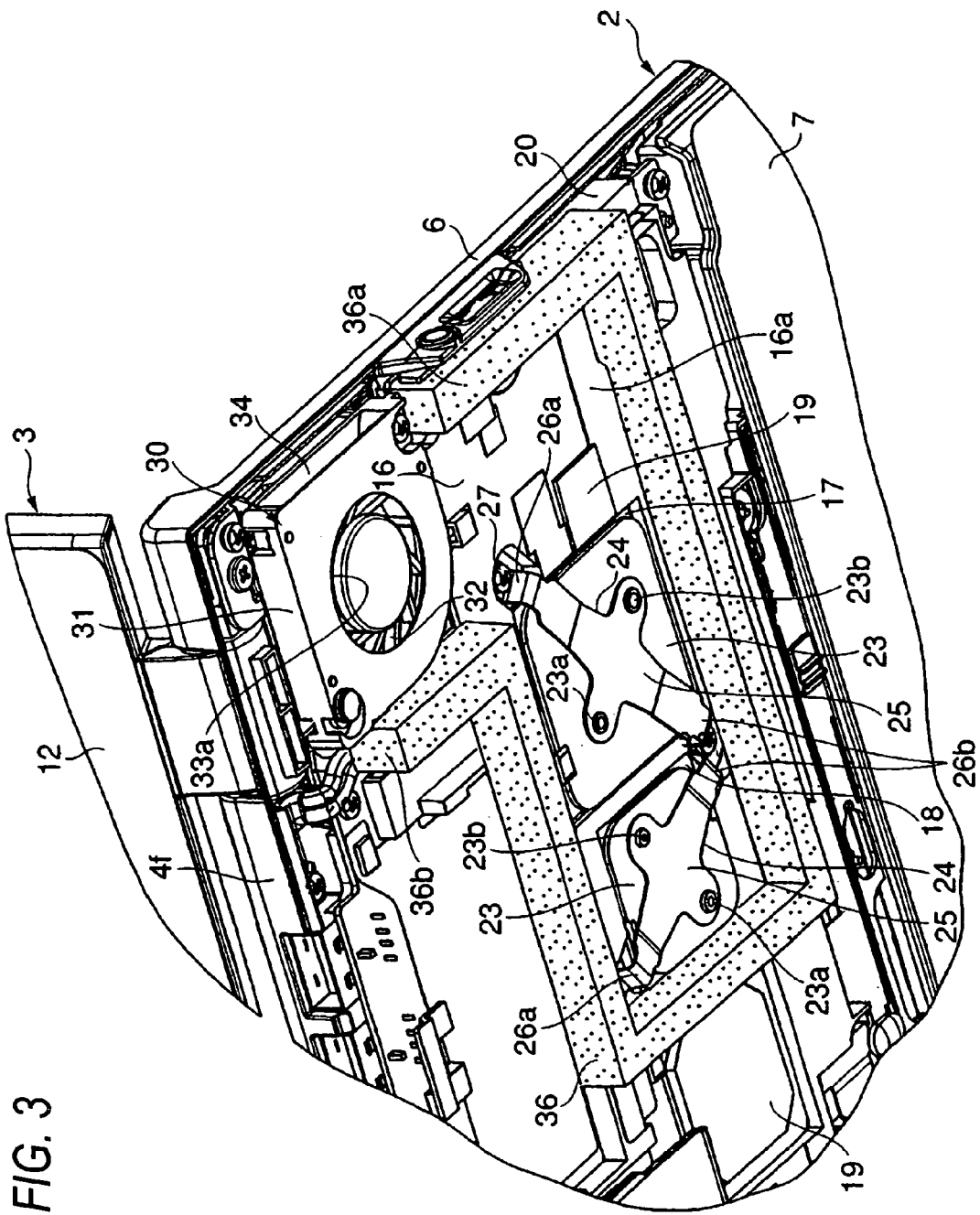
FIG. 3 is an exemplary perspective view showing a positional relationship between thermal diffusion plates thermally connected to a CPU and a gate array, a centrifugal fan, and a partition member of the embodiment.
Figure 4:
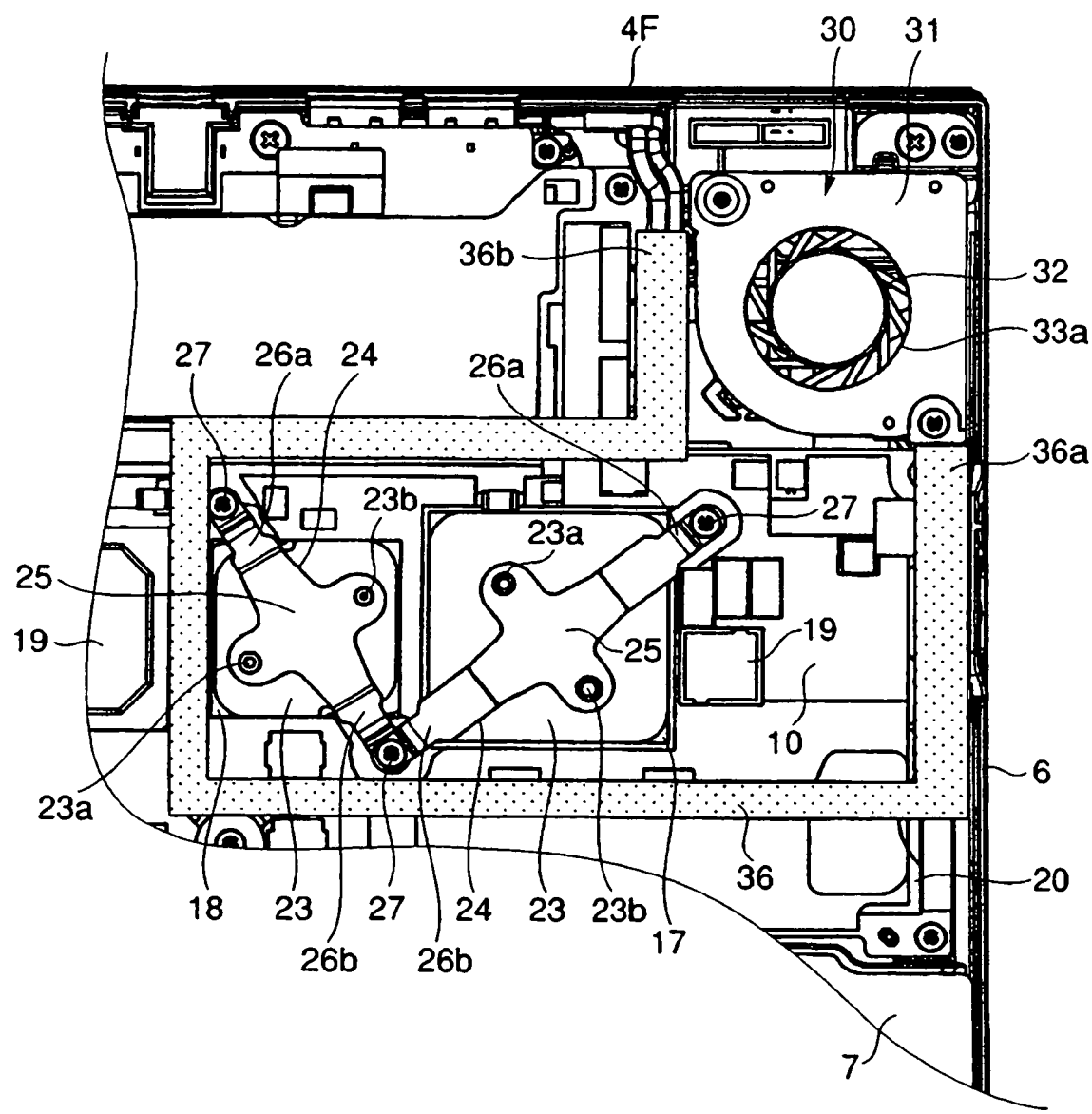
FIG. 4 is an exemplary plan view showing a positional relationship between the thermal diffusion plates, the centrifugal fan, and the partition member of the embodiment.
Figure 5:
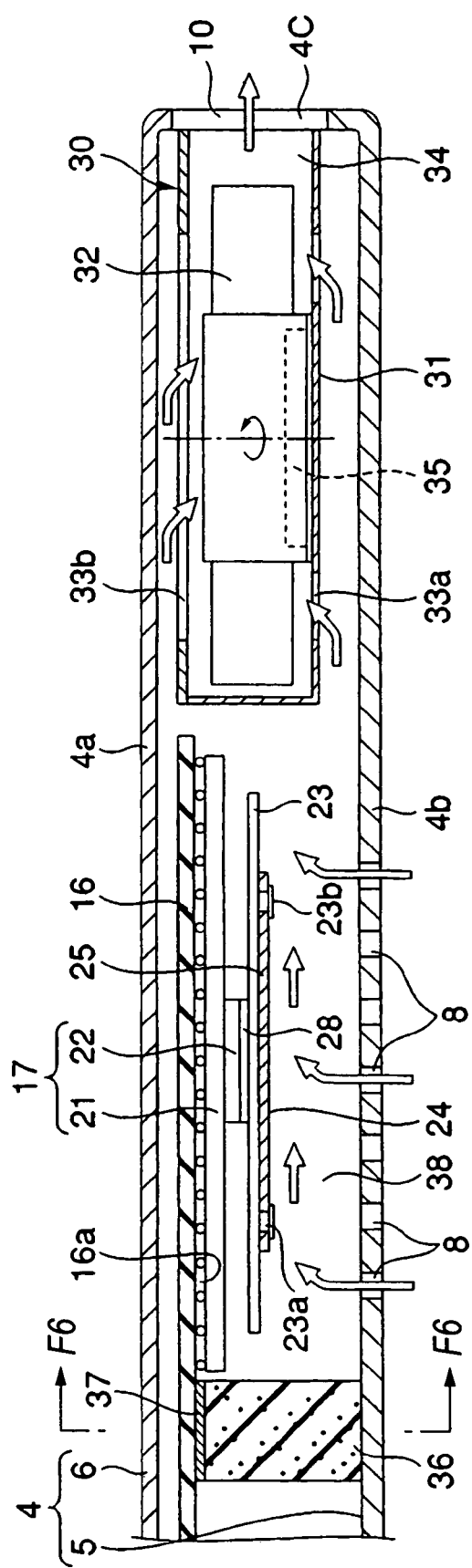
FIG. 5 is an exemplary cross-sectional view of a portable computer showing a positional relationship between a printed circuit board having a CPU, the thermal diffusion plates thermally connected to the CPU, the centrifugal fan, and an air guide passage of the embodiment.

As shown in FIGS. 3 to 5, the first casing 4 houses a printed circuit board 16. The printed circuit board 16 is situated below the upper wall 4a and the keyboard 9 while being supported by the top cover 6. The printed circuit board 16 has a lower surface 16a opposing the bottom wall 4b of the base 5.

A CPU 17, a gate array 18, a plurality of circuit components 19 such as IC chips, and a card holder 20 are mounted on the lower surface 16a of the printed circuit board 16. The CPU 17 and the gate array 18 are examples of heating elements and arranged in the widthwise direction of the first casing 4 so as to come to positions immediately above the air inlet ports 8. Namely, the CPU 17 and the gate array 18 are held in a positional relationship so as to face to the air inlet ports 8 within the first casing 4.

As schematically shown in FIG. 5, the CPU 17 has a base board 21 and an IC chip 22. The base board 21 is soldered to the lower surface 16a of the printed circuit board 16. The IC chip 22 is situated in the center of the lower surface of the base board 21. Amounts of heat developing during operation become extremely large in association with an increase in processing speed and addition of functions.

The IC chip 22 of the CPU 17 and the gate array 18 are thermally connected to thermal diffusion plates 23, respectively. The thermal diffusion plates 23 are formed from a metallic material possessing superior thermal conductivity; e.g., copper, and assume the shape of a square plate which covers the CPU 17 and the gate array 18 from below.

Each of the thermal diffusion plates 23 has a pair of support lugs 23a, 23b. The support lugs 23a, 23b are formed by subjecting the thermal diffusion plates 23 to, e.g., burring, and project downward from the thermal diffusion plate 23.

A mounting bracket 24 is held on each of the thermal diffusion plates 23. The mounting bracket 24 is formed from, e.g., a stainless steel plate. The mounting bracket has a bracket main body 25 and a pair of leg sections 26a, 26b. The bracket main body 25 is laid on the lower surface of the thermal diffusion plate 23 while being aligned with a diagonal line of the thermal diffusion plate 23. The support lugs 24a, 24b projecting from the thermal diffusion plate 23 penetrate through the bracket main body 25. The bracket main body 25 is retained integrally by the thermal diffusion plate 23 by caulking the tips of the support lugs 24a, 24b.

One leg section 26a is situated at one end of the bracket main body 25. The other leg section 26b is situated at the other end of the metal main body 25. The leg sections 26a, 26b are bent at substantially right angles with respect to the bracket main body 25, and extend from the bracket main body 25 to the printed circuit board 16. The tips of the leg sections 26a, 26b are fastened to the printed circuit board 16 by means of screws 27. Therefore, the thermal diffusion plates 23 are held on the printed circuit board 16 by way of the mounting brackets 24.

The mounting brackets 24 held by the thermal diffusion plates 23 possess a spring property. The one mounting bracket 24 presses one of the thermal diffusion plates 23 against the IC chip 22 of the CPU 17. Grease 28 having thermal conductivity is interposed between the IC chip 22 and this one thermal diffusion plate 23. The remaining mounting bracket 24 presses the remaining thermal diffusion plate 23 against the gate array 18.

Consequently, the one thermal diffusion plate 23 thermally connected to the IC chip 22 of the CPU 17 and the other thermal diffusion plate 23 thermally connected to the gate array 18 are situated immediately above the air inlet ports 8 of the bottom wall 4b and face the air inlet ports 8.

The circuit components 19 are situated around the CPU 17 and the gate array 18. The card holder 20 is for removably supporting, e.g., an SD card or a card-like storage medium, and faces the card slot 11 of the first casing 4. The circuit components 19 and the card holder 20 bulge from the lower surface 16a of the printed circuit board 16.

As shown in FIGS. 3 to 5, a centrifugal fan 30 is housed in the first casing 4. The centrifugal fan 30 is situated in a corner defined by the left sidewall 4c and the rear wall 4f of the first casing 4 and adjacent to the CPU 17 and the gate array 18.

The centrifugal fan 30 has a flat fan case 31 and an impeller 32. The fan case 31 is supported by the upper wall 4a of the top cover 6. This fan case 31 has first and second air take-in ports 33a, 33b and an air outlet port 34. The first air take-in port 33a is formed in the lower surface of the fan case 31, and the second air take-in port 33b is formed in the upper surface of the fan case 31. The air outlet port 34 is formed in an outer peripheral surface of the fan case 31, and is in communication with the air outlet port 10 of the first casing 4.

The impeller 32 is housed in the fan case 31 and coaxially situated between the first and second air take-in ports 33a, 33b. The impeller 32 is supported by the fan case 31 by way of a motor 35. The motor 35 operates when the temperature of the CPU 17 or that of the gate array 18 has reached a preset level. When the impeller 32 rotates upon receipt of torque from the motor 35, the internal air of the first casing 4 is taken into the rotational center of the impeller 32 by way of the first and second air take-in ports 33a, 33b. The thus-taken air is emitted to the inside of the fan case 32 from the outer periphery of the impeller 32, and is discharged toward the vent port 10 from the air outlet port 34.

As shown in FIGS. 3 to 5, a partition member 36 is sandwiched between the bottom wall 4b of the first casing 4 and the lower surface 16a of the printed circuit board 16. The partition member 36 is formed from, e.g., elastically-deformable sponge or a soft rubber material having a foaming characteristic, and assumes a prismatic shape having a square cross-sectional profile.

Figure 6:
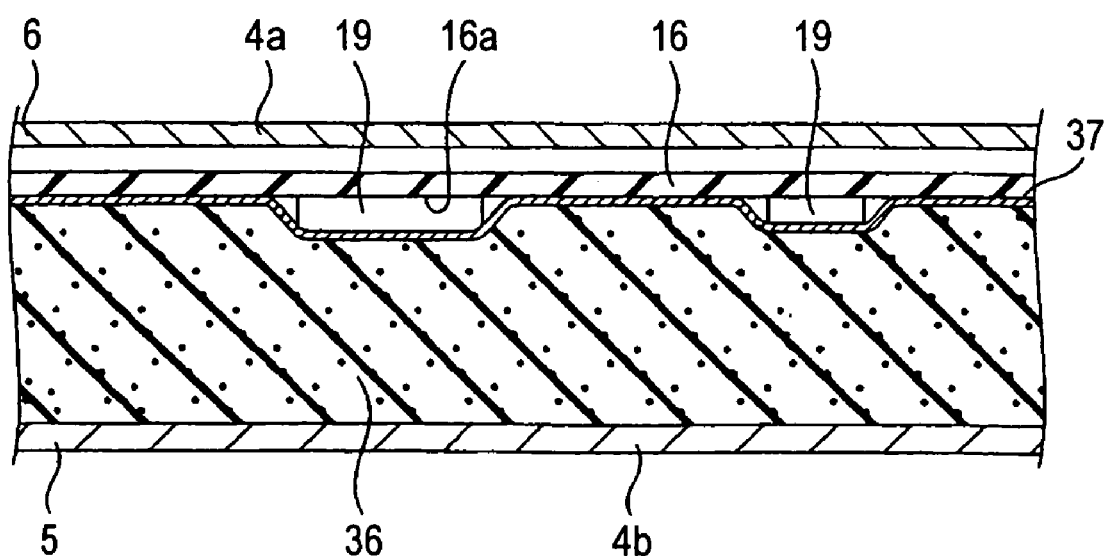
FIG. 6 is an exemplary cross-sectional view taken along line F6-F6 in FIG. 5.

The partition member 36 is affixed to the lower surface 16a of the printed circuit board 16 by way of a double-sided adhesive tape 37 so as to surround the CPU 17 and the gate array 18. As shown in FIG. 6, the double-sided adhesive tape 37 is affixed directly onto the circuit components 19 and the card holder 20 when the circuit components 19 or the card holder 20 is present in the position where the partition member 36 is to be affixed. Therefore, the partition member 36 runs across the circuit components 19 and the card holder 20.

The partition member 36 has a first end portion 36a and a second end portion 36b. The first and second end portions 36a, 36b are spaced apart from each other in the widthwise direction of the first casing 4, and remain in contact with the fan case 31 of the centrifugal fan 30.

The surface of the partition member 36 opposite the double-sided adhesive tape 37 is pressed against the bottom wall 4b of the first casing 4. Consequently, the partition member 36 is compressed in the thicknesswise direction of the first casing 4 between the bottom wall 4b and the printed circuit board 16, and remains in close contact with the bottom wall 4b and the printed circuit board 16.

In cooperation with the bottom wall 4b and the printed circuit board 16, the partition member 36 forms an air guide passage 38 within the first casing 4. The air guide passage 38 is separated from the inside of the first casing 4 so as to extend from the CPU 17 and the gate array 18 to the centrifugal fan 30.

Accordingly, the air inlet ports 8 opposing the CPU 17 and the gate array 18 are situated in the upstream end of the air guide passage 38, and the first and second take-in ports 33a, 33b of the centrifugal fan 30 are opened in the downstream end of the air guide passage 38.

By means of such a configuration, the CPU 17 and the gate array 18 generate heat when the portable computer 1 is in use. The heat developing from the CPU 17 and the gate array 18 propagates through the respective thermal diffusion plates 23, and uniformly diffuses to every part of the respective thermal diffusion plates 23. Thus, most of the heat generated by the CPU 17 and the gate array 18 is emitted to the air guide passage 38 through the thermal diffusion plates 23.

The motor 35 of the centrifugal fan 30 operates when the temperature of the CPU 17 and that of the gate array 18 have reached preset levels. When the impeller 32 of the centrifugal fan 30 has started rotating, negative pressure is exerted on the air inlet ports 8 of the first casing 4, and the external air of the first casing 4 is taken into the air guide passage 38 by way of the air inlet ports 8.

The thermal diffusion plates 23 that receive the heat from the CPU 17 and the gate array 18 are situated immediately above the air inlet ports 8. Therefore, the air taken into the air guide passage 38 from the air inlet ports 8 is blown directly to the thermal diffusion plates 23 as indicated by the arrow in FIG. 5, and the thus-blown air flows along the lower surfaces of the thermal diffusion plates 23. Thus, the thermal diffusion plates 23 are uniformly cooled, and the air heated by thermal exchange of the thermal diffusion plates 23 flows toward the centrifugal fan 30 within the air guide passage 38.

The internal air of the air guide passage 38 is taken into the rotational center of the impeller 32 from the take-in ports 33a, 33b of the fan case 31. The thus-taken air is emitted to the inside of the fan case 31 from the outer periphery of the impeller 32, and is discharged outside of the first casing 4 from the outlet port 34 by way of the air outlet ports 10.

According to such a portable computer 1, the air taken into the air guide passage 38 from the air inlet ports 8 when the centrifugal fan 30 has operated can be blown directly to the thermal diffusion plates 23 that receive the heat from the CPU 17 and the gate array 18. Therefore, the CPU 17 and the gate array 18 can be efficiently cooled by way of the thermal diffusion plates 23, and dedicated heat pipes for transferring heat can be obviated.

Moreover, the radiant heat emitted from the CPU 17 and the gate array 18 to the air guide passage 38 can be discharged to the outside of the first casing 4 by means of the air flowing through the air guide passage 38. Consequently, the radiant heat from the CPU 17 and the gate array 18 has difficulty in staying within the first casing 4, thereby preventing an increase in the internal temperature of the first casing 4.

In addition, according to the above-described configuration, the air guide passage 38 guiding the air that has been used for cooling the thermal diffusion plates 23 is formed as a result of the CPU 17 and the gate array 18 being surrounded by the spongy partition member 36. Put another way, the bottom wall 4b of the first casing 4 and the printed circuit board 16 also function as constituent elements of the air guide passage 38. Accordingly, a custom-designed heat sink having a wind guide such as that employed conventionally is obviated.

Therefore, in addition to obviation of a necessity for a heat pipe, the number of components required for cooling the CPU 17 and the gate array 18 can be curtailed. Consequently, the CPU 17 and the gate array 18 can be efficiently cooled with a simple configuration. Cost reduction of the portable computer 1, weight reduction of the same, and miniaturization of the same can be embodied.

Further, since the partition member 36 is affixed to the lower surface 16a of the printed circuit board 16 by way of the double-sided adhesive tape 38, the shape of the air guide passage 38 can be set freely. Therefore, even when the number of heating components which require cooling has increased or the position of the centrifugal fan 30 has been changed, such a change can be readily executed. A large-scale change in the design of the first casing 4 becomes unnecessary.

The present invention is not limited to the above-described embodiment and can be carried out while being modified within the scope of the present invention.

For instance, the heating element is not limited to a CPU and a gate array but may be a chip set. The number of heating elements opposing the air inlet ports is not limited to that employed in the embodiment.

Moreover, the electronic apparatus of the present invention is not limited to a portable computer. The present invention can be carried out similarly even in the case of a portable information terminal (Personal Digital Assistant) not having a display unit.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. An electronic apparatus comprising:
    a casing having a bottom portion in which an air inlet port is formed;
    a circuit board housed in the casing;
    a heating element which is mounted on the circuit board and faces to the air inlet port;
    a fan which is housed in the casing, takes in internal air of the casing, and blows the air to outside of the casing; and
    an elastically-deformable partition member interposed between the circuit board and the bottom portion, the partition member surrounding the heating element and defining an air guide passage in the casing in cooperation with the circuit board and the bottom portion, the air guide passage extending from the heating element to the fan.

2. The electronic apparatus according to claim 1, wherein the partition member is sponge, and is affixed to the circuit board by a double-sided adhesive tape.

3. The electronic apparatus according to claim 2, wherein the partition member is compressed between the circuit board and the bottom portion in a thicknesswise direction of the casing.

4. The electronic apparatus according to claim 1, wherein the air inlet port is situated at an upstream end of the air guide passage, and the fan is situated at a downstream end of the air guide passage.

5. The electronic apparatus according to claim 4, further comprising a thermal diffusion plate thermally connected to the heating element;
wherein the air taken into the air guide passage from the air inlet port during operation of the fan is blown to the thermal diffusion plate.

6. The electronic apparatus according to claim 5, further comprising a mounting bracket by which the thermal diffusion plate is supported on the circuit board, the mounting bracket having a spring property for pressing the thermal diffusion plate toward the heating element.

7. The electronic apparatus according to claim 1, wherein the partition member has first and second end portions connected to a fan case of the fan, respectively.

8. An electronic apparatus comprising:
a casing having a bottom portion;
a circuit board housed in the casing;
a heating element mounted on the circuit board;
an elastically-deformable partition member interposed between the circuit board and the bottom portion and defining an area in the casing in cooperation with the circuit board and the bottom portion, the area containing the heating element; and
a fan having an air take-in port positioned within the area and an air outlet port positioned outside the area.

9. The electronic apparatus according to claim 8, wherein the partition member is sponge, and is affixed to the circuit board by a double-sided adhesive tape.

10. The electronic apparatus according to claim 9, wherein the partition member is compressed between the circuit board and the bottom portion in a thicknesswise direction of the casing.

11. The electronic apparatus according to claim 8, further comprising a thermal diffusion plate thermally connected to the heating element; and
a mounting bracket by which the thermal diffusion plate is supported on the circuit board, the mounting bracket having a spring property for pressing the thermal diffusion plate toward the heating element.

12. The electronic apparatus according to claim 8, wherein the partition member has first and second end portions connected to a fan case of the fan, respectively.

13. An electronic apparatus comprising:
a casing having a bottom portion;
a circuit board housed in the casing, the circuit board having first and second areas;
a heating element mounted on the first area of the circuit board;
an elastically-deformable partition member interposed between the circuit board and the bottom portion and surrounding the first area; and
a fan having an air take-in port through which air in the first area is taken in.

14. The electronic apparatus according to claim 13, wherein the partition member is sponge, and is affixed to the circuit board by a double-sided adhesive tape.

15. The electronic apparatus according to claim 14, wherein the partition member is compressed between the circuit board and the bottom portion in a thicknesswise direction of the casing.

16. The electronic apparatus according to claim 13, further comprising a thermal diffusion plate thermally connected to the heating element; and
a mounting bracket by which the thermal diffusion plate is supported on the circuit board, the mounting bracket having a spring property for pressing the thermal diffusion plate toward the heating element.

17. The electronic apparatus according to claim 13, wherein the partition member has first and second end portions connected to a fan case of the fan, respectively.

* * * * *